May 11, 1965   M. ZAJAC   3,182,526
MOTORIZED MACHINE TOOL WAY UNIT
Filed Dec. 26, 1962   12 Sheets-Sheet 1
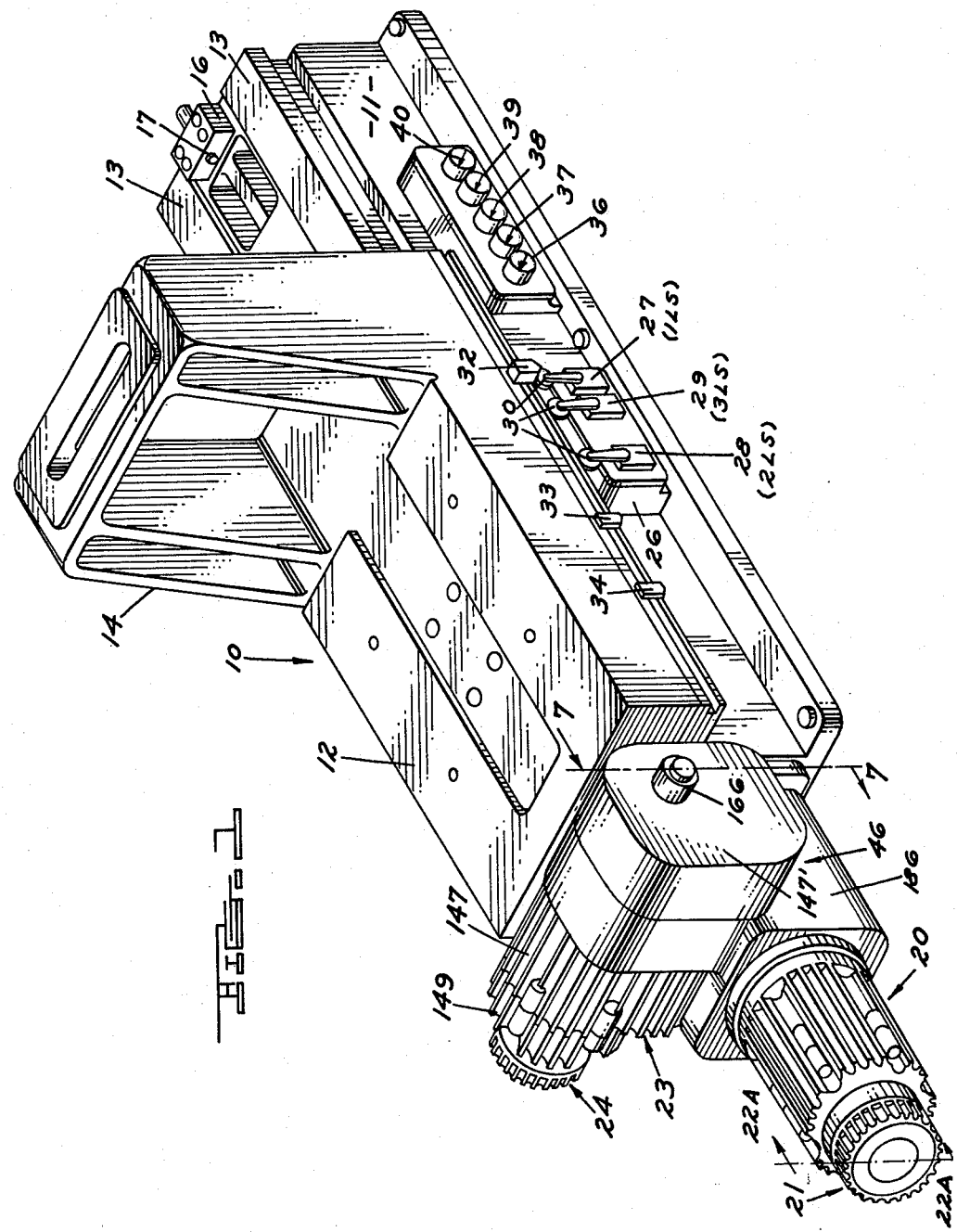
INVENTOR.
MICHAEL ZAJAC
BY
ATTORNEYS

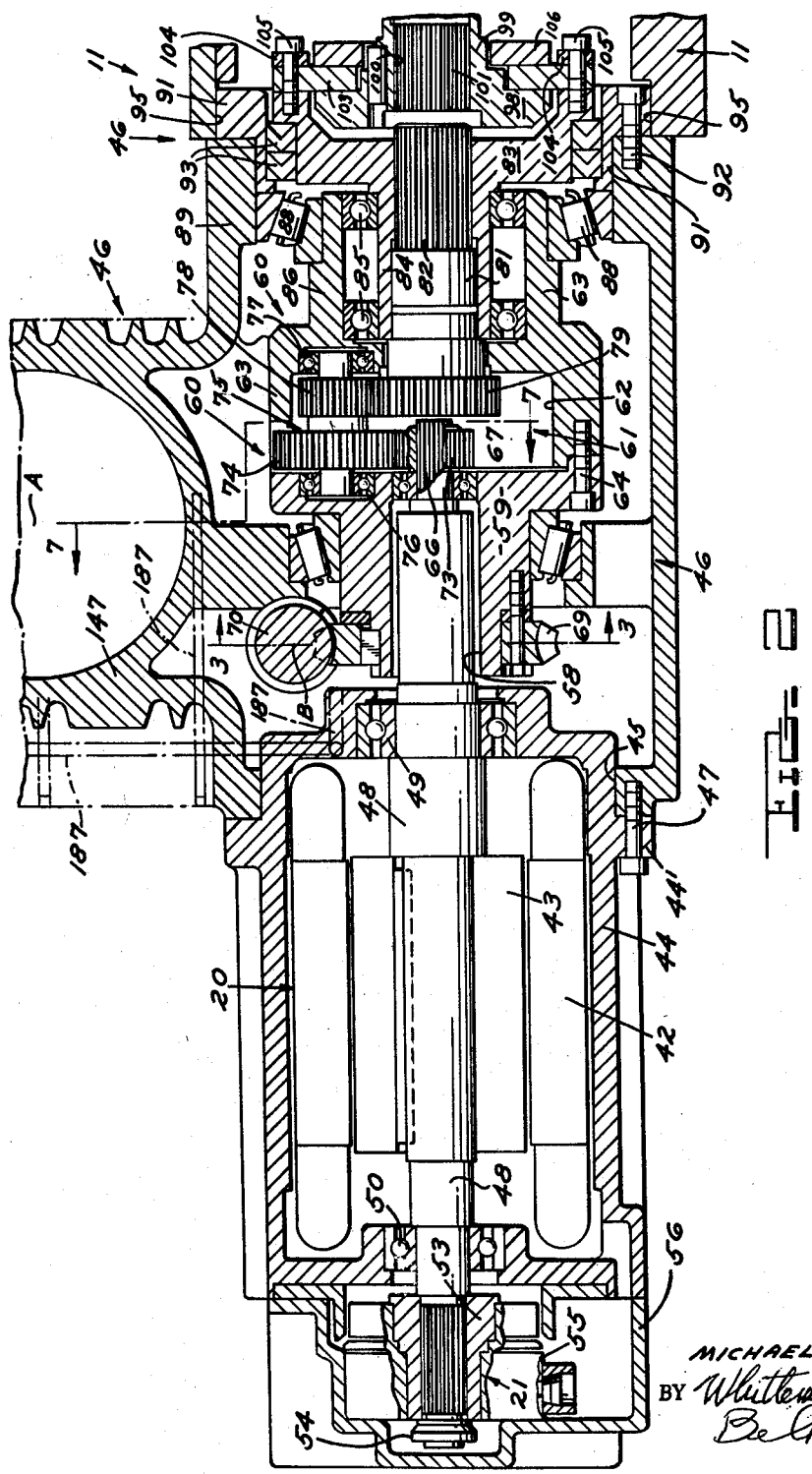

INVENTOR.
MICHAEL ZAJAC
BY
ATTORNEYS

May 11, 1965   M. ZAJAC   3,182,526
MOTORIZED MACHINE TOOL WAY UNIT
Filed Dec. 26, 1962   12 Sheets-Sheet 7

INVENTOR.
MICHAEL ZAJAC
BY Whittemore Hulbert
Belknap
ATTORNEYS

May 11, 1965  M. ZAJAC  3,182,526
MOTORIZED MACHINE TOOL WAY UNIT
Filed Dec. 26, 1962  12 Sheets-Sheet 8
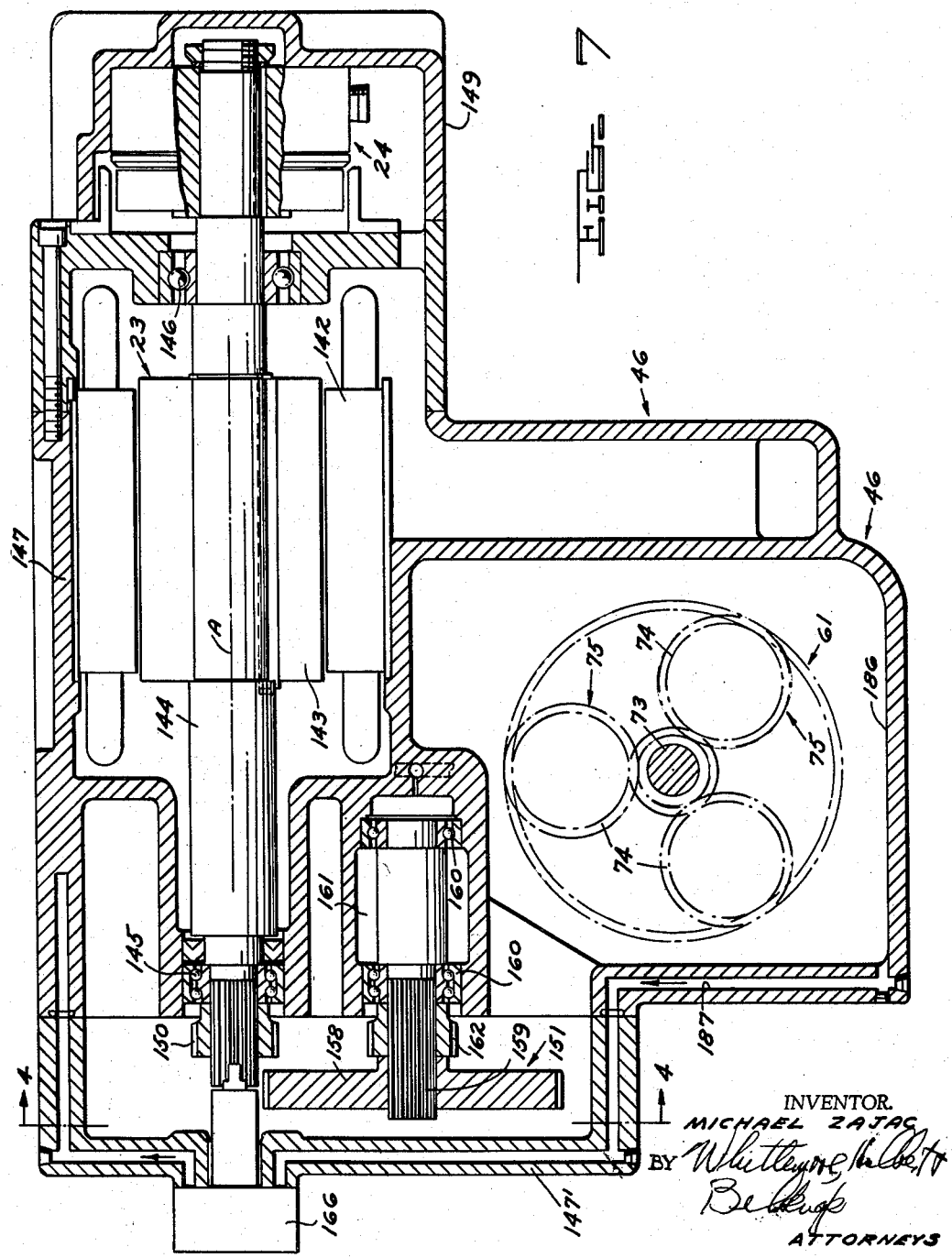

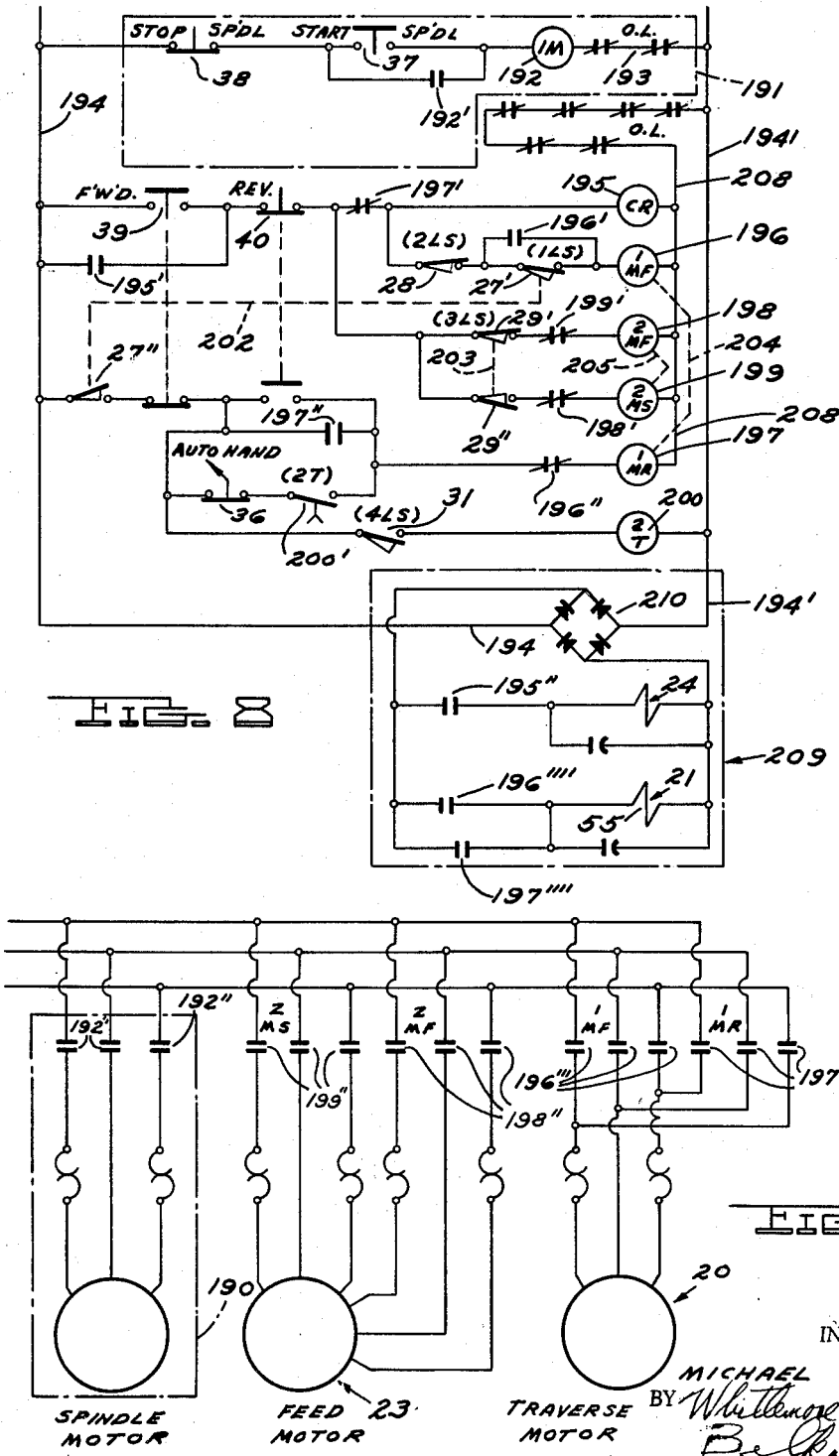

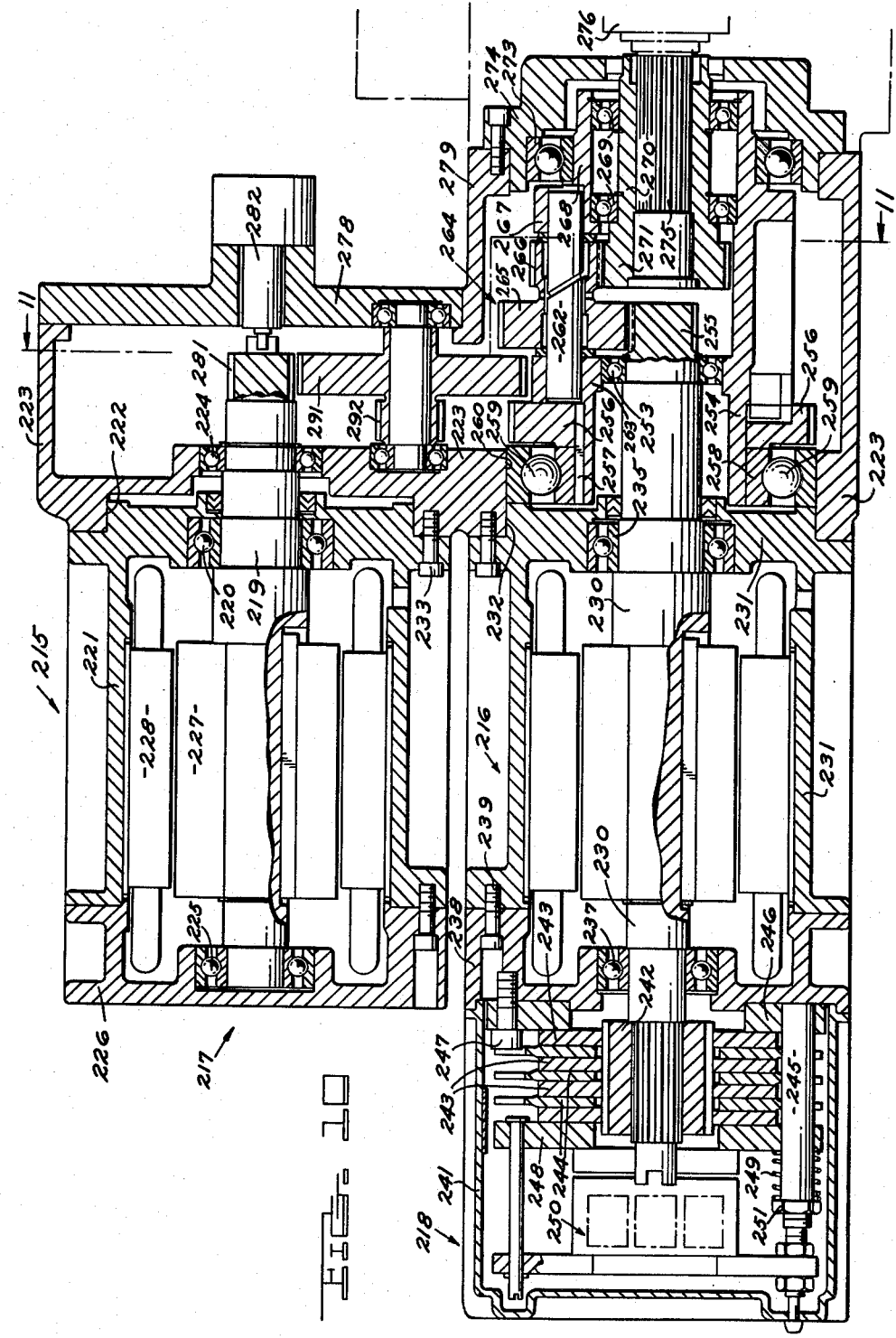

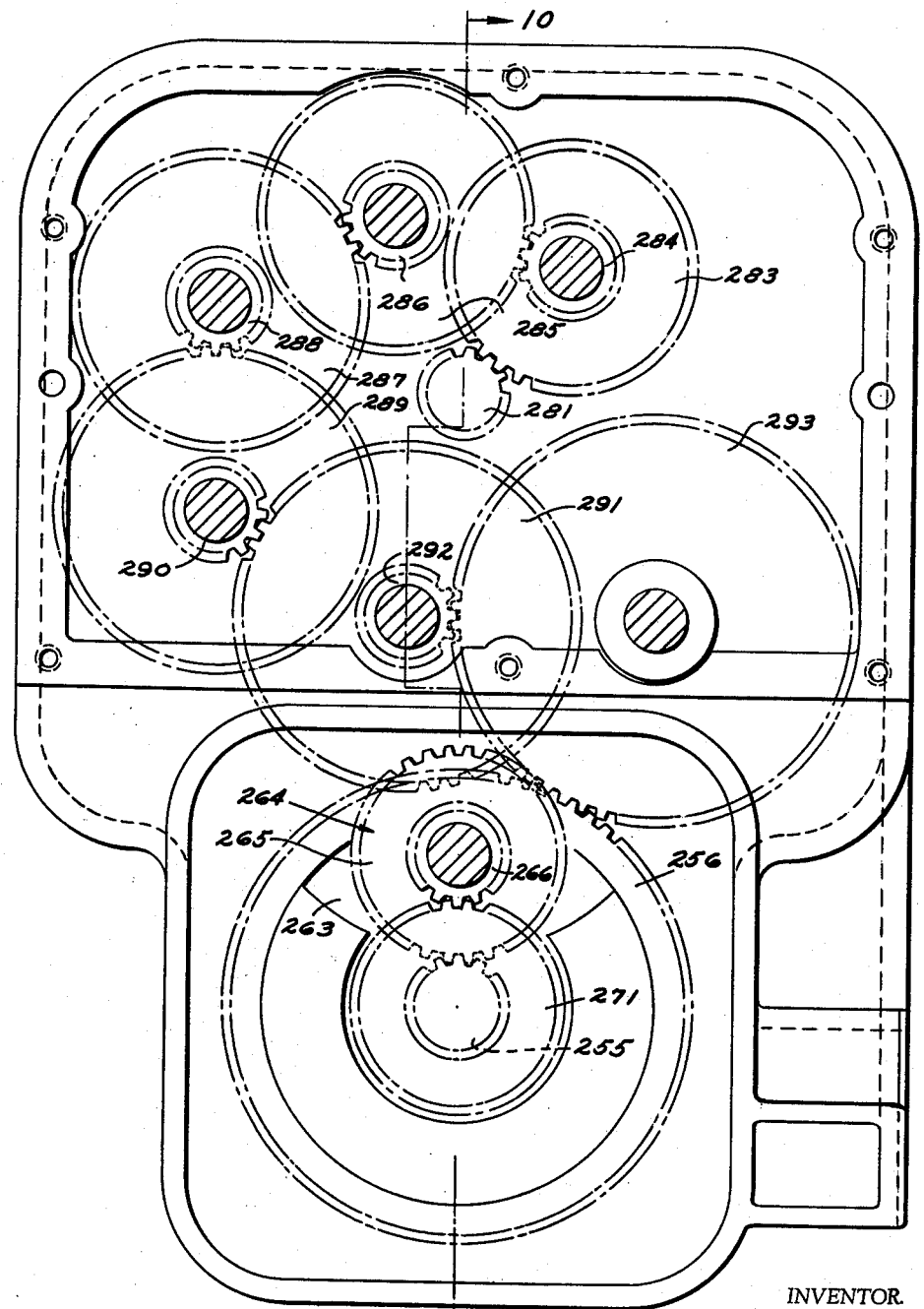

INVENTOR.
MICHAEL ZAJAC
ATTORNEYS 3,182,526
MOTORIZED MACHINE TOOL WAY UNIT
Michael Zajac, Inkster Village, Mich., assignor to Buhr Machine Tool Company, Ann Arbor, Mich., a corporation of Michigan
Filed Dec. 26, 1962, Ser. No. 246,892
8 Claims. (Cl. 74—675)

The present invention relates to improvements in a motorized or mechanical drive for the tool carrying platen and way unit of a machine tool and, more particularly, although not limited in this respect, to the drive for a machine tool of the type employed in multiple to perform a number of different types of machining operation in mass production transfer equipment now commonly in use. Primarily for economic reasons, such equipment is ordinarily powered hydraulically for its traverse and feed and return strokes by hydraulic cylinder and piston means, involving distinct phasings of the stroke components, i.e., as to rapid forward traverse, a first fast feed, a second slow, working feed, a dwell at depth, and a rapid return traverse. This unsmooth type of speed transistion is particularly undesirable in a multiple tool installation. Likewise, there is inevitably and frequently a loss of expensive and inflammable hydraulic liquid, raising considerations of safety and cost.

It is therefore a general object of the present invention to provide a combined traverse and feed drive for such a machine tool way unit having strictly mechanical provisions for efficiently and with a relatively lower power requirement moving a cutter tool of one or another type smoothly and in an integrated stroke toward a workpiece in successive, merged rapid traverse and relatively slow in-feed phases of the tool-carrying platen, i.e., without any abrupt stop or transition interval, however brief, at the interchange from one phase to another.

In general accordance to the invention, this result is produced by driving the platen through the combined agencies of a planetary gear set and a further speed-reducing gear set or unit, with motors for the respective gear sets compounded in driving the platen at a variable speed over a considerable range. In accordance with the invention, both motors are driven continuously at the outset or platen in-feed stage of the reversing stroke cycle, successively cutting out to obtain the desired smooth speed gradation throughout the cycle.

It is contemplated that the above-mentioned further gear set may, should circumstances warrant, be a worm and worm gear type operated from a feed motor through spur gearing, and in turn connected to the output shaft through the planetary set; or in the alternative and as preferred because of its lesser cost, greater compactness and other advantages, such further set may simply be a two deck spur gear set driven by the feed motor and direct-connected to the planetary set. In either case, the planetary set also has a direct drive from a second, traverse motor.

Another object of the invention is to provide a machine tool drive featuring a combined motor drive, including a drive from an electromagnet brake-equipped rapid traverse motor directly through a planetary gear set to a mechanical device for advancing and withdrawing a tool-carrying platen, such device being, for example a recirculating ball and nut type screw unit. With this type of direct planetary drive the invention compounds a feed drive motor, which motor is operatively connected through a further gear set of one sort or another to the cage of the planetary gear set. Thus the cage, when rotated jointly by the feed motor, acts to modify and increase to a desired level the speed of platen and tool travel in the rapid traverse phase; and when the rapid traverse motor cuts out the planetary gearing combines with said further gear set or unit (which is preferably a simple spur gear set for the advantages referred to) to afford a desired lower, preferably two speed, feed level at which the tool operates on the work to dwell depth.

Still another object is to provide a dual motorized type drive as described which further incorporates a frictional slip drive connection. In one embodiment this connection comprises a slip clutch at the output to the ball nut device for the purpose of absorbing shock at the forward limit of the travel of the way unit, such clutch canceling out excess torque which would otherwise be imposed on the feed motor's electromagnet motor brake. In another and preferred embodiment of the invention, the slip is permitted at the brake of the traverse motor.

Thus in the preferred combination, the brake with which the rapid traverse motor is equipped is an electromagnetic one and has means to adjust the force under which its spring biased disks are engaged for the braking action. Traversing drive is from the traverse motor shaft to the output shaft through the planetary cage and gear set. When a smooth transition of lower speed shaft drive is then made to the feed motor, the latter drives through the staged or tandem speed reducing spur gear set and planetary unit until cutting depth of the tool-mounting platen is reached and the latter approaches bottom. A limit switch is now tripped to start a timer, which upon timing out opens the circuit of the feed motor and puts that of the traverse motor in reverse. Since the platen may bottom inertially and prior to de-energizing the feed motor and reversing the traverse motor, the torque incident to the bottoming thrust is transmitted back through the ball nut platen drive, and in the reverse direction through the planetary gearing and cage to the shaft of the traverse motor, the latter still being under energization. However, the brake of the traverse motor permits a disk slip at this very brief interval to prevent damage.

A further object is to provide a unit as described which is of minimum internal dimensions, enabling force-feed lubrication of the parts thereof with a minimum of splash, as well as for most efficient lubrication regardless of whether the unit is disposed to act horizontally or vertically. Likewise, motor housing components are preferably of light weight aluminum enabling a very efficient dissipation of motor heat.

A further object is to provide a motorized mechanical machine tool way mechanism of the sort described, in which there is provided in combination with one another an anti-friction ball nut type platen driving unit, connected to the output end of a compounded spur gear and planetary gear type, variable speed arrangement; in which said combined gearing arrangement is composed of very compact two deck spur and planetary gear sets capable of being employed as a "package" unit in a single gear housing or box, in substitution for existing standard motor and gear drive provisions; and in which improved provision is made for disassembling the drive means in an easy and expeditious way from the remainder of the way unit. Thus, the gearing and its output mechanism as a whole, whether with the traverse motor or after dismantling of the latter from the gearing, may be pulled axially from the ball nut unit; and the traverse motor may be pulled in a moment's time from the component gearing sub-combination. The ball nut unit may also be pulled from the platen, either with the gear assembly or after initial dismantling of the latter.

In general, it is an object to provide a motorized machine tool way unit capable of producing smoothly integrated or merged rapid traverse and slow feed phases without any abrupt in-feed speed interchange; in which an extremely desirable range of rapid traverse and slower speed platen movements is possible; in which the rapid traverse and slow feed motors and their associated gear sets are mounted for convenient access for inspection or servicing; and in which the compounded gear driving provisions may be mounted as a compact, removable and replaceable package directly to the rear of an existing type of way unit, thus following a currently popular "building block" principle in the design of equipment of the character in question.

The foregoing as well as other objects will become more apparent as this description proceeds, especially when considered in connection with the accompanying drawings illustrating the invention, wherein:

FIG. 1 is a perspective view of one embodiment of the improved way unit of the invention, incorporating traverse and feed motors arranged at 90° related axes;

FIGS. 2 and 2A are fragmentary views representing, when combined, a view in longitudinal vertical section through the feed axis of this embodiment of the equipment, as in the vertical plane 2, 2A—2, 2A of FIG. 1, or in vertical section along line 2—2 of FIG. 3;

FIG. 7 is a view in transverse vertical section along a line corresponding to broken line 7—7 of FIG. 2, or in the transverse vertical plane designated 7—7 of FIG. 1, showing features of a two-speed feed motor and its associated brake in relation to the planetary gear set of the way unit;

FIG. 8 is a schematic wiring diagram showing various electrical components controlling the rapid traverse and slow feed motors of the unit, as well as spindle motor and platen motor units;

FIG. 9 is a schematic wiring diagram illustrating generally the mode of energization of the rapid traverse, slow feed and spindle motors of the way unit, the spindle motor drive constituting no part of the invention;

FIG. 10 is a view in longitudinal or axial section along line 10—10 of FIG. 11, through the motor and gearing section of a way unit in accordance with an alternative embodiment of the invention, preferred over those of FIGS. 1 through 7 because of its greater simplicity and compactness leading to a greatly reduced cost of production;

Figure 12:
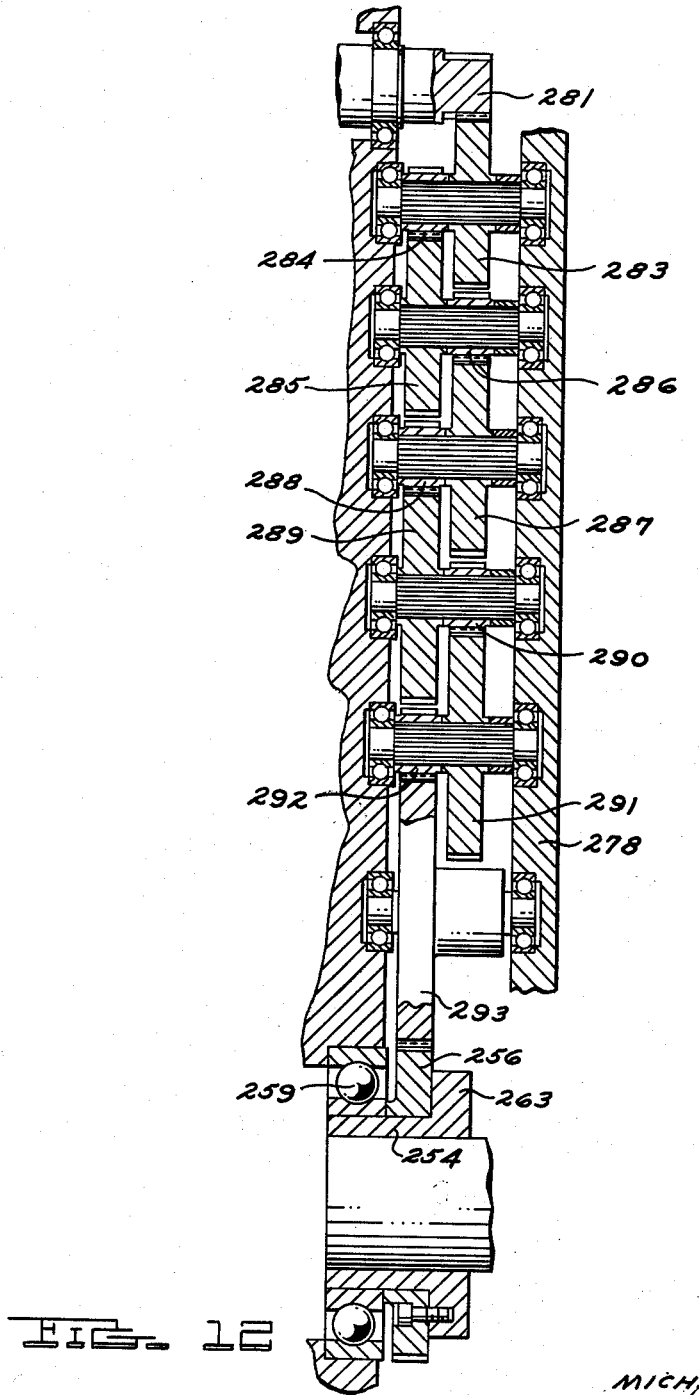

FIG. 11 is a view in transverse vertical section along broken line 11—11 of FIG. 10, illustrating a spur gear set for the drive of the way unit of FIG. 10 from its feed motor, as combined with sun and planetary gear components also involved in this drive, as well as that from the rapid traverse motor; and FIG. 12 is a developed view in a single plane of the spur gear components of the combined gearing unit of FIG. 11.

First referring to FIG. 1 of the drawings, a first embodiment of the machine tool way unit in which improvements of the invention are incorporated (FIGS. 2 through 9 also dealing with this embodiment) is generally designated by the reference numeral 10. It comprises a massive elongated cast base 11 and a suitable tool-mounting platen 12 slidable on upper parallel and horizontal ways 13 of the base 11, in an entirely conventional manner. The platen 12 is shown as equipped with an integral upright mounting bracket 14 for the tool (not shown). The structure of the platen constitutes no part of the invention; and it may find its equivalent in any suitable tool support having appropriate means to mount thereon and drive the desired operating tool.

The base 11 is provided at its forward end (right-hand as viewed in FIG. 1) with an upper block 16 mounting a fixed positive stop 17, which serves as a limit against which the platen 12, or some part rigidly carried thereby, may abut and bottom at the forward extreme of platen travel, in which position the machine tool has a "dwell" phase.

The reference numeral 20 in FIG. 1 generally designates a rapid traverse motor, having its shaft disposed longitudinally of way unit 10, this motor being of, say, two horsepower, 1800 r.p.m. rating; while the reference numeral 21 generally designates a conventional rotating gear type electromagnetic brake applied to the motor shaft in a known fashion.

The reference numeral 23 in FIG. 1 generally designates a two speed feed motor of, say, two horsepower, 1800/900 r.p.m., disposed on transverse axis; and the reference numeral 24 generally designates a conventional electromagnetic brake applied to the shaft of the motor 23.

Electrical controls for the way unit 10, as illustrated in FIG. 1 (being also illustrated in the wiring diagrams of FIGS. 8 and 9) include a limit switch unit 26 comprised of a double-acting, ganged limit switch 27, responsive to the movement of platen 12 in both directions in a limited zone adjacent its fully retracted or back position; a second limit switch 28, single acting in character, and a third double-acting, ganged limit switch 29 between the two others. These respective limit switches 27, 28 and 29 are conventionally equipped with operating roller arms 30, and are respectively further designed in the wiring diagram of FIG. 8 as "1LS," "2LS" and "3LS." There is also another limit switch 31, shown only in FIG. 8 and further designated 4LS, which is located on the machine base 11 adjacent the forward positive stop 17, the switch 31 being engaged and operaed by the platen 12 or a part carried thereon just as the platen and machine tool enter and leave the forward terminal dwell phase.

The switches 27, 28 and 29 are respectively operated by tappets or dogs 32, 34 and 33 which are fixedly but adjustably mounted in longitudinally spaced relation to one another along a side of the sliding platen 12 of unit 10. Tappet 32 is offset outwardly in relation to the tappets 33 and 34, so as to bidirectionally engage only the actuator roller arm of double-acting limit switch 27 adjacent the forward dwell zone.

Electrical control provisions for the improved way unit also include certain manually operated switches, of which the push buttons appear in FIG. 1. Hence the reference numerals applied to these push buttons are employed in FIG. 8 to designate the switches to which they correspond. These switches are an "Automatic"-"Hand" switch 36 (the push button being rotatively oriented at the "Hand" setting only when manual cycling of the unit is desired), a "Spindle Start" switch 37, an emergency "Spindle Stop" switch 38, a "Unit Forward" switch 39, and a "Unit Reverse" switch 40; representation of all of these switches is found in FIG. 8.

Referring now to FIG. 2 of the drawings, the rapid or traverse motor 20 comprises the usual stator and rotor parts 42, 43, respectively, mounted within a housing 44. This motor housing has a radially extending circumferential flange 44' adjacent its inner end which pilots in a circular end opening 45 of a gear housing or box 46, hereinafter referred to, the housing 44 being secured to housing 46 by a series of bolts 47. The motor shaft 48 has the rotor 43 splined thereto and is mounted in this general piloting zone by means of a ball bearing 49 in housing 44. The opposite end of shaft 48 is similarly journalled by a ball bearing 50 in the motor housing 44.

The electromagnetic brake 21 includes an armature part 53 splined on the end of motor shaft 48 and held in place by a retainer nut 54, with conventional brake coil components 55 surrounding this part within a brake housing 56. Such coil means appear in the wiring diagram of FIG. 8, although specific energizing and control provisions for the brake 21, like those for the drive and control of the spindle motor of the tool (shown only in FIGS. 8 and 9) constitute no part of the present invention.

The motor driven shaft 48 extends to the right, as viewed in FIG. 2, into a cylindrical axial recess 58 of a hub of a first part 59 of a two part planetary gear cage, generally designated 60; and a planetary gear and pinion mechanism, designated 61, is mounted within a recess 62 of a second coaxial part 63 of cage 60, to which second part the part 59 is removably secured by a series of bolts 64.

Shaft 48 has a reduced diameter right-hand terminal portion 66 which is splined for the drive of the planetary set 61 and is piloted in a ball bearing 67 within the cage recess 58. Thus it is seen that, by reason of the piloting of the motor housing 44 in the gear housing 46 at cylindrical surface 45, and the piloting of the motor shaft 48 within the planetary gear cage 60 at bearing 67, the entire motor and shaft structure may be pulled axially from the cage 60 and associated parts, simply upon removing the motor housing mounting bolts 47, leaving the gearing means of the planetary set 61 (to be described) within the housing 46.

A worm gear 69 (FIG. 2) is keyed and releasably bolted to the left-hand end of the hub of the planetary cage part 59, being driven by a meshing worm 70. This worm gear structure is also illustrated in FIG. 3 of the drawings and will be further described in connection with that figure and FIGS. 4 and 5.

The right-hand splined end 66 of motor shaft 48 drivingly receives a small planetary sun pinion 73 which, as shown in FIGS. 2 and 7 of the drawings, is in mesh with three larger diameter planetary gears 74 of three gears clusters 75 spaced equally about sun pinion 73. The opposite ends of these cluster gears are rotatably mounted within the parts 59 and 63 of planetary gear cage 60 by means of ball bearings 76 and 77, respectively. Each gear 75 further includes a smaller diameter planetary pinion 78 in mesh with a larger diameter sun gear 79 secured on the left-hand end (FIG. 2) of an output driving stem or shaft 81; and this shaft or stem has a splined right-hand extremity 82 drivingly connecting the same to a radially enlarged flange of an intermediate output or drive disk 83, i.e., at the interior of an integral hub member 84 of that disk.

The hub member 84 is mounted by ball bearings 85 within an integral tubular hub extension 86 of the second planetary cage part 63; and the hub 86 is in turn journalled by a combined radial and end thrust bearing 88 within an enlarged annular right-hand boss 89 (FIG. 2) of the worm and planetary gear housing 46. This boss has an end bearing and seal retainer ring 91 secured thereto by a series of bolts 92; and the flanged drive disk 83 runs rotatively within the ring 91, being sealed against leakage of oil by a pair of coaxial sealing washers or disks 93.

Figure 2A:
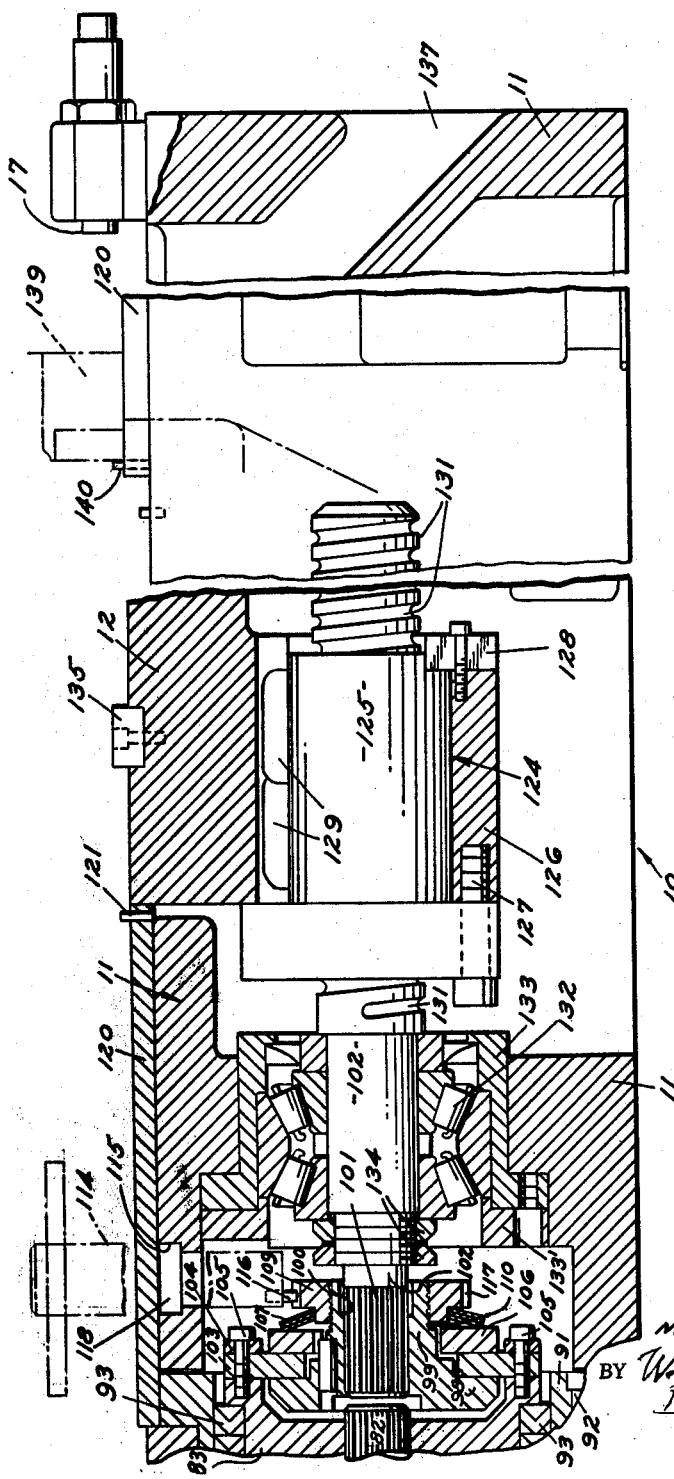
Figure 3:
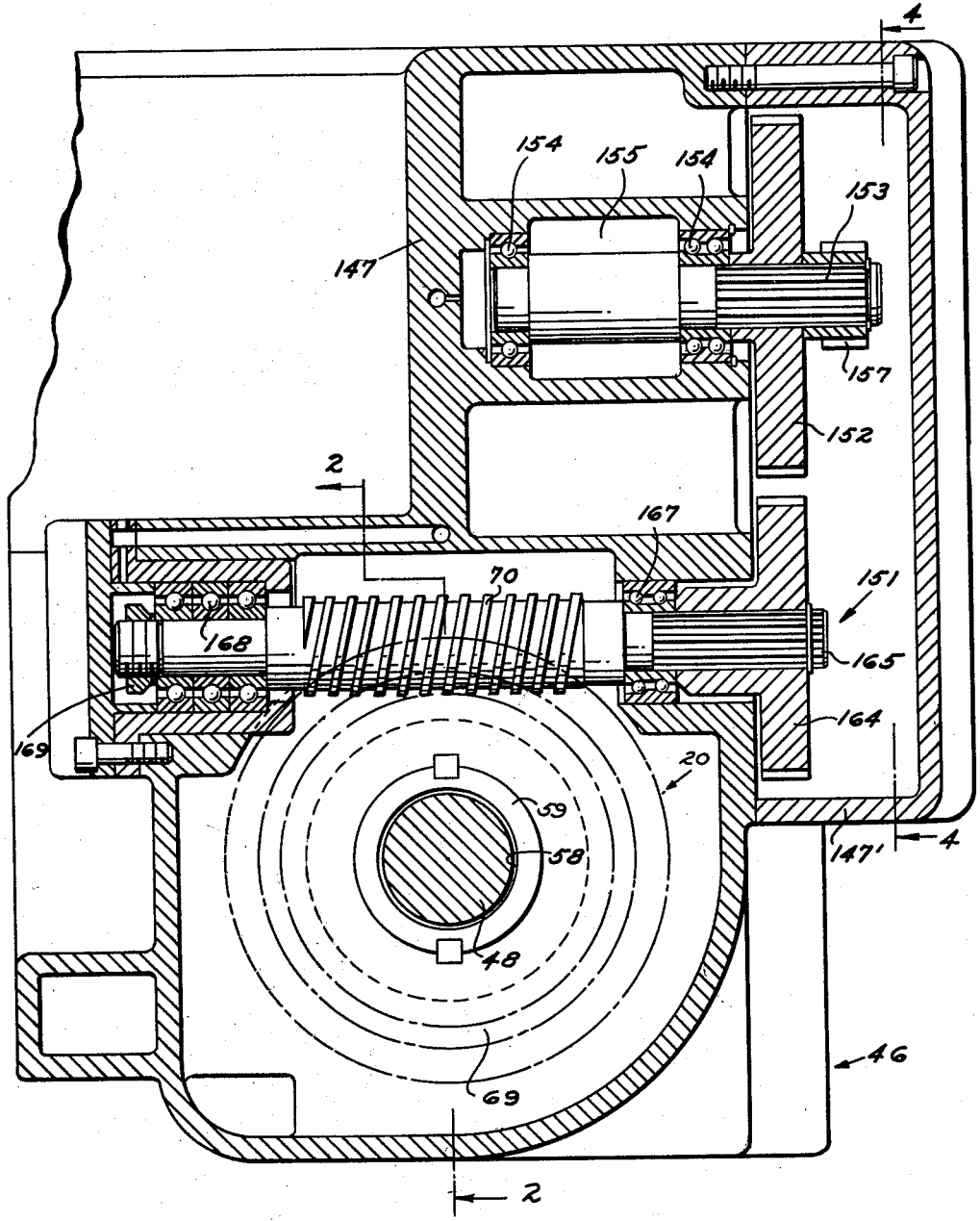
FIG. 3 is a view in transverse vertical section along a line corresponding to line 3—3 of FIGS. 2 and 4.

It will be noted in FIG. 2 that the retaining ring 91 is piloted within an internal cylindrical left-hand shoulder surface 95 of the base 11 of the way unit. Thus, the entire drive gear housing 46 and shaft structure, including the worm 70 and worm gear 69 and the planetary gearing set 61, its cage 63 and associated bearing and like parts may be removed endwise, either with or without first drawing the motor assembly 20; and without affecting the remaining ball nut and screw provisions (to be described) for the mechanical drive of the platen 12, such provisions being shown in FIG. 2A of the drawings and being hereinafter described.

It will be appreciated from the foregoing that, with the traverse motor 20 of the described tandem gear arrangement driven at rated speed (instanced at 1800 r.p.m.), its drive will be transmitted to the flanged intermediate output disk 83 directly through the agency of the planetary gear and pinion set 61 with a given speed reduction. Since the feed motor 23 is also energized at the beginning of the forward traverse cycle, it will (through a spur gear train to be described) drive the worm-worm gear set 69, 70 at a predetermined reduction from the higher rating of feed motor 23, indicated to be 1800–900 r.p.m. in range. This drives planetary cage 60 in the direction of rotation of output disk 83, the planetary clusters adding a predetermined relatively small speed increment to the speed induced by the direct drive by the planetary set 61 itself. Such differential action is an important aspect of the invention.

When the traverse motor 20 cuts out the feed motor alone continues the platen drive, through the agency of the planetaries, hence at a desired reduction beneath its higher speed rating, and without any transition halt in the speed change. Subsequently the feed motor is dropped to its lower rating to finish the operating stroke up to "dwell." Upon a timed reversal the traverse motor platen 12 to its initial, retracted position. These considerations will be more fully discussed at a later point.

Referring now to FIG. 2A in conjunction with FIG. 2, the reference numeral 98 designates a second flanged drive disk having an integral tubular axial hub 99 which is internally splined at 100 to drivingly engage the reduced splined end 101 of the shaft 102 of a ball nut and screw unit (to be described), through the direct agency of which the platen 12 is traversed.

A suitable friction safety slip disk or ring 103 is secured by a clamp ring 104 and bolts 105 to the outer end face of the flanged drive disk 83 adjacent the outer periphery of the latter, and a pressure ring or washer 106 bears against the opposite end surface of slip disk 103, being resiliently urged against the same by a series of Belleville spring disks or washers 107. These in turn abut outwardly against, and are held in adjustable resilient pressing relation to the safety slip disk 103, by means of an externally toothed adjustable pressure ring or member 109, which has external threaded engagement at 110 with the hub 99 of drive disk 98.

It is seen that rotative adjustment of the pressure member 109 on the disk hub 99 in one direction or the other will have the effect of altering the axial end pressure exerted by springs 107 on the pressure washer 106, hence the force by which the safety slip disk 103 drives output member 98 from the intermediate drive disk 83. This slip friction connection provides a cushion preventing damage to the drive means at the end of a forward traverse stroke of the platen 12, as when a part on the latter abuts the fixed stop 17 of the base 11 of the way unit.

The force applied by springs 107 on safety slip disk 103 is adjusted to be slightly less than the grip of the feed motor brake 24, and sufficient to halt feed of the platen under inertial or kinetic forces, thus insuring against possible damage to any driving part. It is apparent that the drive disks 83, 98 and slip friction means just described will be dismantled from the base 11, along with the gear housing 46, when the latter is pulled from its pilot at the surface 95 of base 11, in the manner referred to above.

As shown in dot-dash line in FIG. 2A, a capstan-type of hand tool 114 is provided for the adjustment of the toothed pressure member or ring 109. This tool is adapted to be received within a countersunk radial opening 115 through the top portion of base 11 to the space in which the adjusting member 109 is disposed. At its inner end, the tool 114 is provided with an eccentric pin 116 projecting therefrom, a pointed end of the pin 116 being engaged with teeth 117 of adjusting member 109. Hence rotative manipulation of tool 114 will cause adjusting rotation of pressure member 109 in one direction or another along the hub 99 of drive member 98 to adjust the force on safety slip disk 103. The radial hole 115 is normally sealed by a closure plug 118, which is shown in FIG. 2A as being covered by an end of a sliding chip cover 120, this cover member being drawn to the right (FIG. 2A) upon forward advance in that direction by the platen, and returned when the platen retracts. For this purpose, the chip cover 120 is provided with an upright pin 121 engageable with a suitable part of the platen 12 following a predetermined advance of the latter.

The ball nut unit is generally designated in FIG. 2A by the reference numeral 124. It is a conventional type readily available in the market, featuring a ball nut cage 125 fixedly mounted within a depending bracket member 126 located centrally of and within the platen 12. Cage 125 is held in place on this bracket by bolts or screws 127 at one end and a semi-ring 128 on the bracket at the other end. It includes the usual ball return tube means 129; and the screw formation 131 of the ball nut unit 124 is an integral part of the shaft 102. Shaft 102 is mounted by combined radial and axial thrust bearing means 132 within an apertured cup-like bearing housing 133, which is in turn bolted to a retainer ring 133′ within base 11. The bearings 132 are further held in place by nuts 134 threaded on and adjacent the rear or left-hand end (FIG. 2A) of shaft 102, rearwardly of which thread the shaft is splined for drive by disk 98.

By releasing the nuts 134, once the above-described motor and gearing units have been removed, the bearing housing 133 may be withdrawn from the ball nut shaft 102. Upon removal of the screws 127 the entire ball nut unit may be removed from the platen bracket 126. Further, if the helix pitch of ball nut screw 131 is such that the unit 124 is reversible, the screw alone may be pulled along with the gearing and bearing units, without removing ball nut housing 125 from the platen 12.

It is to be understood that the platen 12 has means, such as a connecting piece 135 above its bracket part 126, for drivingly connecting the platen to a machine tool (not shown). Adjacent the forward end thereof, the base 11 of the way unit is provided with a chip chute 137 through which chips, shavings and the like generated in the machine tool operation are discharged. The part 139 (dotdash line in FIG. 2A) represents a part of a machine tool carried by platen 12 (or a part of the platen) which is adapted to engage a second forwardly extending pin 140 carried by the chip cover 120, so as to retract the same upon a rearward retractile stroke of the sliding platen 12.

Figure 4:
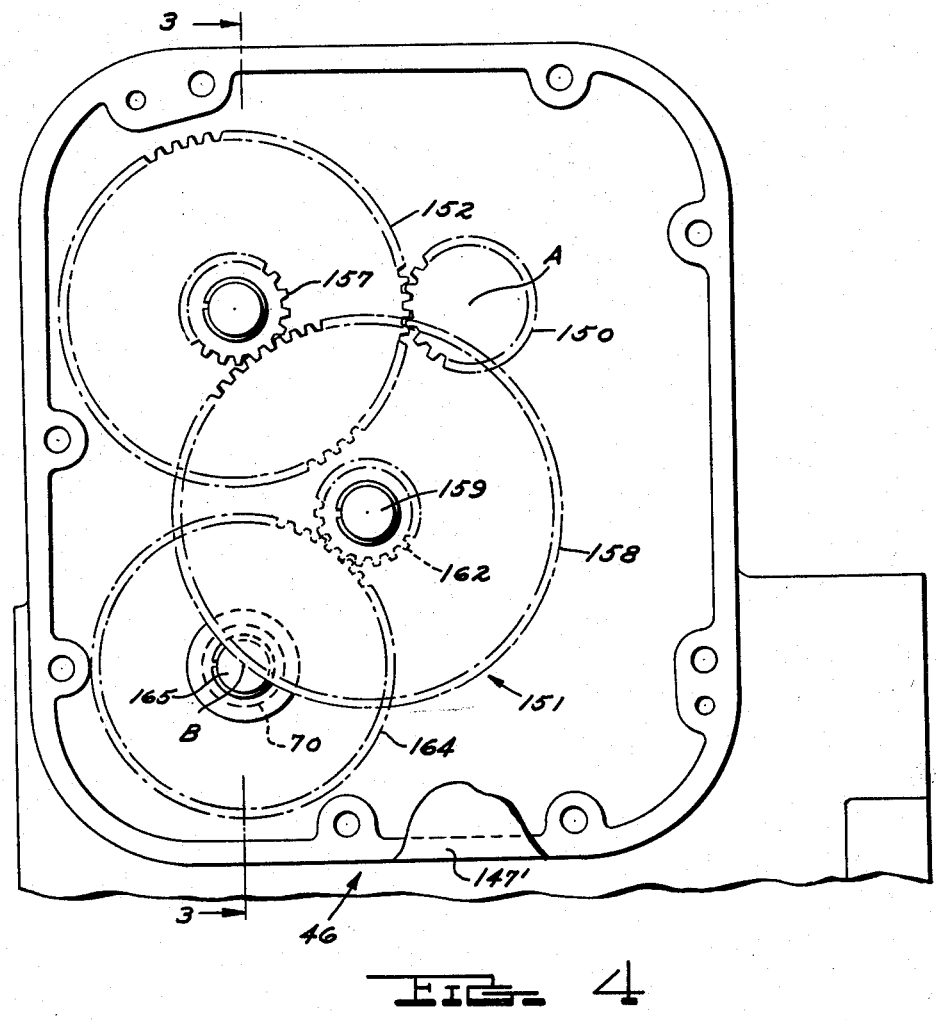
FIG. 4 is a view in vertical longitudinal section viewed along a line corresponding to line 4—4 of FIGS. 3 and 7, showing a spur gear driving train from the feed motor arranged in two decks.

Referring now to FIG. 7 in conjunction with FIGS. 3 and 4, the feed motor 23 of the dual motor way unit 10 is shown as being comprised of a stator winding component 142 and a rotor 143 keyed upon a motor shaft 144, the axis of which is designated "A" for comparison with FIG. 4. Shaft 144 is journalled by ball bearings 145, 146 in a suitably finned motor housing portion 147 of gear housing 46, which is fabricated of aluminum for desired heat dissipation. This is true also of the housing 44 for traverse motor 20. The electromagnetic brake 24 (structurally similar to traverse motor brake 21) is mounted to the outer end of shaft 144, being enclosed in its own brake housing 149.

At the opposite end thereof, outboard of bearing 145, the motor shaft 144 has a small diameter pinion 150 splined thereon, at which the drive originates for a train 151 of spur gearing for the drive of the worm 70.

Figure 5:
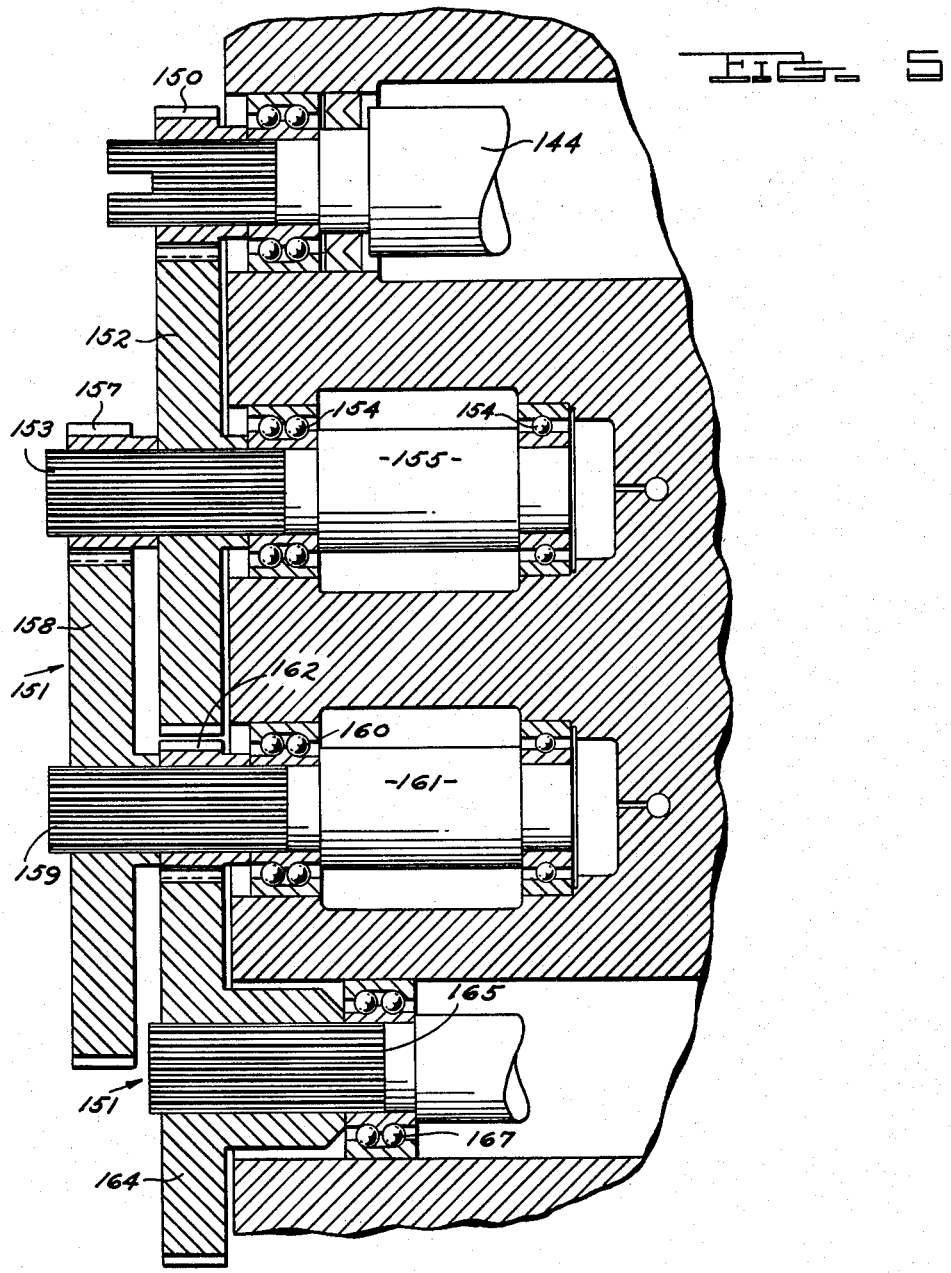
FIG. 5 is a developed view in cross section in a single plane through the two-deck spur gear driving components.

This train of gearing is, as shown in FIG. 4, 5 and 7, mounted within a removable cover plate or box 147′ applied to the upper motor housing portion 147 of gear box 46 at the top and one end of the latter. The train 151 comprises the following: A spur gear 152 (FIGS. 3 and 5) with which the small motor shaft pinion 150 meshes, the gear 152 being splined on a shaft 153 which is rotatably mounted by ball bearings 154 to extend through a lubricant seal box 155 carried by the housing structure; a small diameter pinion 157, also splined on the shaft 153 outboard of gear 152; a large diameter gear 158 (FIGS. 4, 5 and 7) splined on a shaft 159 mounted for rotation by ball bearings 160 and to extend through a lubricant sealing box 161, the gear 158 meshing with the pinion 157; a small diameter pinion 162 (FIGS. 4, 5 and 7) splined on the shaft 159 inboard of gear 158; and a gear 164 (FIGS. 3 and 5) splined on a shaft 165 which may be integral with the worm 70. The worm axis is denoted "B" in FIGS. 2 and 4.

Accordingly, and as best illustrated in the single plane, developed view of FIG. 5, the gear train 151 transmits power from motor shaft 144 through pinion 150, gear 152, shaft 153, pinion 157, gear 158, shaft 159, pinion 162 and gear 164 to the shaft 165 of worm 70. The spur gear power train is extremely compact, involving only two decks of gears arranged on a common end zone of the motor housing portion 147, and is conveniently accessible for inspection or servicing upon removal of cover 147′.

This cover carries a pump housing 166, as shown in FIGS. 1 and 7, encasing a pump (not shown) for the force-feed lubrication of the gear components. The pump is suitably driven from motor 23 in a manner not germane to the invention.

As appears in FIGS. 3 and 5, the worm 70 is rotatably mounted on the housing structure by a ball bearing 167 adjacent its gear 164, the opposite end of the worm being carried in a sealed bearing 168 held in place by a retainer nut 169. This unit typifies the bearing structure contained in the boxes 155 and 161 previously referred to.

Figure 6:
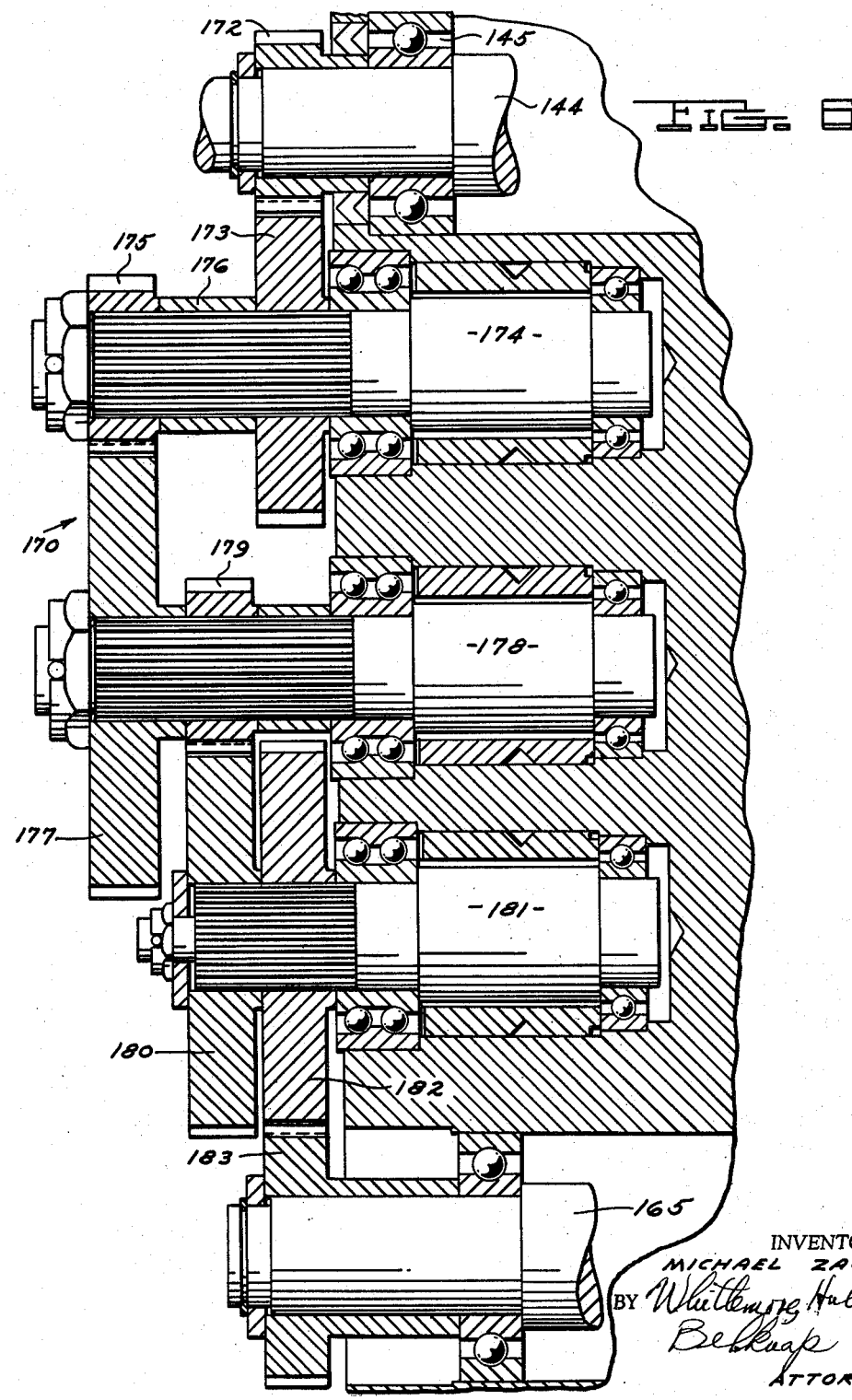
FIG. 6 is a developed, single planar sectional view similar to FIG. 5 but involving an alternately available three-deck arrangement of spur gearing, including optionally variable change speed gears.

FIG. 6 of the drawings is a view illustrating, in a single plane, developed manner similar to FIG. 5, an alternative form of spur gear train, designated 170, for the drive of the shaft 165 of worm 70 from the shaft 144 of the dual speed feed motor 23. This is a three deck arrangement, including gears as follows: A small diameter pinion 172 secured on worm shaft 144 outboard of the bearing 145 and meshing with a spur gear 173 splined on an intermediate, housing-mounted shaft 174; a small pinion 175 also splined on shaft 174 and spaced outwardly of gear 173 by a sleeve 176; a gear 177 with which pinion 175 meshes, gear 177 being splined upon an intermediate shaft 178; a pinion 179 mounted inboard of gear 177 and in mesh with a gear 180 splined on a further intermediate shaft 181; a further intermediate shaft 181; a further gear 182 of the same diameter and tooth number also splined on shaft 181 inboard of gear 180; and a gear 183 splined upon worm shaft 165, with which gear 182 is in driving mesh.

Of the gears of the alternative gear train design just described, the pinions 175 and 179 and the gears 177 and 180 are feed change gears, preferably hardened and honed, which, by selective interchange as to diameter, will give a range of gear and worm speed ratios from 60:1 to 5:1. A maximum change of four gears and a minimum of two gears is involved.

FIG. 7 of the drawings shows the positional arrangement of the planetary gear set 61 in an inetgral sump portion 186 at the lower part of the gear housing 46 and beneath the spur gearing train 151 described above. The walls of the housing structure are bored, as at 187, for the force-feeding of lubricant from pump housing 166; and this makes it possible to maintain a minimum oil level within housing 46, with minimum splash whether the tool axis is horizontal or vertical.

In the wiring diagrams of FIGS. 8 and 9 of the drawings, for the sake of simplicity certain relays are given identifying reference numerals as applied to the relay coils, the latter being further lettered for cross-reference, and corresponding reference numerals, primed in single or in multiple, are employed to designate the corresponding respective contacts of such relays, as operated upon energization of the respective coils.

The reference numeral 190 in FIG. 9 designates a motor circuit for the energization of the spindle motor of a machine tool (not shown) carried by platen 12; and in FIG. 8, the reference numeral 191 generally designates a start stop switch and relay circuit, also for the spindle motor. These motor and control circuits constitute no part of the invention; however, it may be noted that the circuit 191 comprises a motor actuating relay 192 (1M), a contact 192' of which is connected in shunt across the spindle start switch 37 and in series with the spindle emergency stop switch 38, with overload contacts 193 also included in this series connection between main power line leads 194, 194'.

The reference numerals 195, 196, 197, 198, 199 and 200 in FIG. 9 respectively designate a cycling relay (CR); a motor, forward, relay (1MF) for traverse motor 20; a traverse motor, reverse, relay (1MR); a first feed relay, fast, (2MF) for feed motor 23; a second feed relay, slow, (2MS) for motor 23; and a timing relay (2T) for the feed motor 23.

The double-acting limit switch 27 (1LS) is shown as having contacts 27', 27" ganged by a mechanical connection 202, and the double-acting limit switch 29 (3LS) is shown as having contacts 29', 29" similarly ganged by a connection 203. Likewise, the traverse motor relays 196, 197 are mechanically ganged by a connection 204 and the feed motor relays 198, 199 by a connection 205.

One set of contacts of the forward and reverse manual switches 39, 40, respectively, are in series across the power lead 194 and a further auxiliary lead 208 having a connection to the second power lead 194', along with the coil of cycle relay 195 and a normally closed contact 197' of traverse motor reverse relay 197; and a normally open contact 195' of cycle relay 195 is shunted about the forward manual switch 39 to a connection with the power lead 194. The contact of the single acting limit switch 28 (2LS) is connected in parallel with cycle relay 195, between contact 197' of the reverse traverse motor relay and the lead 208, in a circuit also including the contact 27' of limit switch 27 and the traverse motor relay 196, with contact 27' shunted by a contact 196' of the last named relay.

The second set of ganged contacts of forward and reverse manual switches 39 and 40 are disposed in a circuit between leads 194, 194' including a second ganged contact 27' of limit switch 27 (2LS), a second contact 197" of traverse motor reverse relay 197, the "Auto-Hand" manual control switch 36, the contact 200' of feed motor timing relay 200 and the limit switch 31 (4LS) mounted adjacent the forward, "dwell" end of the traverse platen 12, i.e., adjacent the fixed stop, and the coil of timing relay 200 itself.

There is also a circuit, paralleling the last described one, connected between the junction of contacts 197" (traverse motor reverse) and 200' (feed motor timing), including a second, normally closed contact 196" of traverse motor forward relay 196, plus traverse motor reverse relay 197, this circuit also being tapped to the auxiliary lead 208.

One of the ganged contacts 29' of limit switch 29 (3LS) is connected in series, along with the normally closed contact 199' of the slow feed relay and the fast feed coil 198, between the junction of a contact of manual reversing switch 40 with normally closed contact 197' and the auxiliary lead 208; and there is an interlock circuit paralleling this circuit, including the second contact 29" of limit switch 29 (3LS), a normally closed contact 198' of the fast feed motor relay, and the coil of the slow feed motor relay 199.

The reference numeral 209 in FIG. 9 generally designates a motor brake control circuit for the traverse motor and feed motor brakes 21, 24, respectively. Other than as generally connected in the circuitry of the controls for the respective traverse and feed motors 20, 23, the circuit 209 comprises no part of the invention. It is supplied by leads 194, 195' through a full wave rectifier 210.

In the operation of the improved motorized drive unit, the button of manual forward switch 39 is depressed, causing energization of the cycle relay 195, the traverse motor, forward, relay 196 and the feed motor, fast, relay 198, through normally closed contacts in circuit with these several relays. As the traverse and feed motors 20, 23 commence to rotate together the platen 12, as driven mechanically through the ball nut unit 124, moves forward in its forward traverse stroke, opening the normally closed contact 27' of limit switch 27 (1LS) by the forward engagement of the platen tappet or dog 32 (FIG. 1) with the actuating roller of the limit switch 27. This is a rapid traverse drive, under the compound tandem action of the worm and planetary sets, to the first feed point, at which the tappet or dog 33 opens the single acting limit switch 27 (2LS), thus deenergizing the traverse motor forward relay 196 (1MF), motor 20 being braked to a halt by brake unit 21.

The unit then drops in the first feed rate (fast) of the two-speed feed motor 23, and continues forward under a drive from worm 70 and worm gear 69, the planetary cage 60 and planetary clusters 75 to the second feed point, at which the tappet 34 engages and actuates limit switch 29 (3LS). This opens the fast feed circuit at limit switch contact 29' and closes the slow feed circuit of motor 23 at the other limit switch contact 29".

The platen continues forward at its feed motor's slow speed until it reaches the open limit switch 31 (4LS) at the positive stop 17, closing this switch and causing the dwell timing relay 200 to be energized. Relay 200 times out after a predetermined dwell at depth, its contact 200' closing to de-energize feed motor relay 199 (the motor 23 being taken braked to a stop by brake unit 24) and energize traverse motor reverse relay 197. The motor 20 is thus energized in the reverse direction and platen 12 commences its stroke to the rear, directly re-opening the limit switch 31 (4LS).

At the rear of the platen stroke the tappet 31 actuates and re-closes limit switch 27, de-energizing traverse reverse relay 197, whereupon the traverse motor 20 is braked to a stop by brake unit 21.

FIGS. 10, 11 and 12 of the drawings illustrate another optional, and preferred embodiment of the drive unit, in particular regard to the motor driven gear components. These have been considerably simplified, particularly by the elimination of the worm and worm gear arrangement of the first embodiment, a considerable simplification and reduction of the number of parts of the planetary set, by a different arrangement of the feed and traverse motors, including the elimination of a brake on the former, and like improvements of a similar nature, leading to an important reduction in the cost of production of the preferred unit, a compacting of the size of the latter, and the like.

Thus, the drive from the feed motor is solely comprised of a spur gear train made up of but two sets or decks of intermeshing spur gears and pinions of cluster gears on parallel axes, gears and pinions meshingly engaging in two parallel planes spaced but slightly from one another in the axial direction. Furthermore, the axis of the traverse motor is coaxial of that of the common output member of the feed and traverse motors, and has a direct spur gear drive connection to one of the gears of a planetary set. All of these arrangements considerably reduce the longitudinal and transverse dimensions of the drive unit.

Yet the basic functioning characteristics of the way unit, as explained in connection with FIGS. 1 through 9, are retained intact; and the electrical wiring remains essentially the same, save for the elimination of braking means for the feed motor. Otherwise, platen driving provisions for the embodiment of FIGS. 10, 11 and 12, including the ball nut unit 124 and its connections to the platen are in general the same as appear in FIG. 2A, hence illustration has not been duplicated in this regard. Provision has been made to eliminate the slip frictional connection between the output of the gear unit and the shaft of the ball nut unit, this function being transferred to the traverse motor brake in a manner to be described.

Referring to FIG. 10 of the drawings, the reference numerals 215 and 216 respectively designate the feed motor and the traverse motor of this modified and simplified drive unit, which it itself generally designated by the reference numeral 217. The motors 215, 216 may be of ratings respectively similar to the motors 20, 23 of the first embodiment, save for the fact that the feed motor 215 is not equipped with a brake; since this function is performed alone by an electromagnetic brake 218 associated with traverse motor 216.

Feed motor 215 has its shaft 219 mounted by a heavy duty ball bearing 220 in a hollow motor housing 221 which is piloted at mating cylindrical surfaces 222 in a spur gear housing 223 into which feed motor shaft 219 extends. This shaft has a further bearing at 224 in gear housing 223. The opposite end of feed motor shaft 219 is journalled by a ball bearing 225 in an end plate 226 fitted to the open outer end of motor housing 221. The rotor and stator of motor 215 are conventionally indicated at 227, 228, respectively.

Rather than having their shafts disposed in a 90° crossing relationship to one another, the shaft 230 of the traverse motor 216 is disposed in a common vertical and longitudinal plane with the feed motor shaft 219. Like the feed motor housing 221, the housing 231 for rapid traverse motor 216 is piloted at 232 in an opening of the gear housing 223, the motor housings 221, 231 being secured to the gear housing 223 by series of bolts or studs 233; and may be readily pulled axially from their piloted connection to the gear housing upon loosening these bolts.

The shaft 230 of traverse motor 216 is journalled at its inner end by a ball bearing 235 in an opening of the end wall of traverse motor housing 231. Shaft 230 is also more outwardly journalled, in the direction of its brake 218 or to the left in FIG. 10, by means of a ball bearing 237 mounted to an intermediate adapter ring or casting 238, which is secured by bolts 239 to the open outer end of motor housing 231.

The electromagnetic brake 218 is disposed in a cup-like housing 241 appropriately secured to the adapter ring or casting 239. It is of a conventional construction, including a gear-like shaft connector 242 splined on the end of traverse motor shaft 230, and in turn having splined to its exterior a series of friction disks 243. These alternate with further friction disks 244 which are restrained from rotation at their periphery, as by straddling pins 245 paralleling the shaft axis and projecting rigidly from a ring 246 which is held by bolts or studs 247 to the adapter ring 238. A pressure plate 248 is adapted to bear against the endmost friction disk 243, being urged thereagainst by a series of coil springs 249 encircling the pins 245.

The reference numeral 250 generally designates the usual coil unit of electromagnetic brake 218; and when it is energized the pressure plate 248 is relieved of axial pressure exerted by springs 249, which otherwise cause plate 248 to compress the brake disks 243, 244, and thus lock transverse motor shaft 230 against rotation relative to the fixed brake and motor housing parts. However, as contemplated by the invention, the force exerted by springs 249 for this purpose is capable of adjustment by manipulation of the spring abutment nuts 251, for the purpose of permitting some slip between the rotatable disks 243 and the fixed disks 244 (normally prevented when the tool is traversing and feeding into the work) when the tool platen bottoms in entering the dwell phase, as by engagement of the platen with a fixed stop such as the frame stop 17 of FIG. 2A. Thus, the embodiment of FIGS. 10, 11 and 12 of the invention builds into the electromagnetic brake 218 the function performed by the slip disk provisions 103, 106, 107 and 109 shown in FIGS. 2 and 2A, and to this significant extent reduces the cost of production of the way unit as a whole.

The traverse motor shaft 230, extending to the right of its ball bearing mount at 235 to its inner housing wall, as viewed in FIG. 10, has a further bearing 253 mounting for rotation thereon an axially elongated tubular member or sleeve 254; and inwardly of the bearing 253, the end of shaft 230 is formed to provide a sun gear 255. Sleeve 254, as mounted to rotate relative to shaft 230 by the bearing 253, has a large diameter ring gear 256 splined thereon at 257, as well as an inner race 258 of a ball bearing 259 carried within an opening 260 on the gear housing 223.

An elongated pin or rod 262 is fixedly mounted in a boss 263 on the sleeve member 254, this pin or rod serving as an arbor for a single cluster gear, generally designated 264, including a relatively large diameter spur gear 265 which meshes as a planet with the sun pinion formation 255 on shaft 230, and a smaller diameter planetary pinion 266. The right-hand end of arbor rod 262 is fixedly carried by a flange portion 267 of a sleeve 268 mounted by ball bearings 269 for rotation relative to a tubular output member 270 which at its left-hand end, as viewed in FIG. 10, is formed to provide a sun gear 271 in mesh with the planetary pinion 266. The tubular member 268 is externally journalled by a ball bearing 273 in an end cap 274, through which the tubular output member 270 extends, having a splined connection at 275 with a member 276. The last named member may be considered to be the shaft of a ball nut (not shown) corresponding to the ball nut unit 124 of FIG. 2A, its splined connection 275 corresponding to the splined connection 101 shown in FIG. 2A.

The gear housing 223 is closed at its right-hand end (FIG. 10) by means of closure plate 278 affording bearing for certain spur gear shafts, to be described. The closure cap 274 bolts to a tubular formation 279 of the gear housing 223 to which plate 278 is applied.

Now considering FIG. 11 in conjunction with FIGS. 10 and 12, the feed motor shaft is formed at its right-hand end (FIG. 10) to provide a driving pinion 281, which may be piloted in the housing plate 278 by means of a suitable bearing member 282. As shown in FIG. 11, pinion 281 meshes with a spur gear 283 of a cluster including a smaller diameter pinion 284. Pinion 284 meshes with a gear 285, coaxial with which is a smaller diameter pinion 286 in mesh with a gear 287. This gear is also part of a two-gear cluster including a pinion 288 meshing with a gear 289; and a pinion 290 coaxially fixed to gear 289 is in mesh with a large diameter spur gear 291. Gear 291 in turn carries a small diameter pinion 292, which meshes with a large diameter gear 293 having a driving connection to the large diameter ring gear 256.

Through the agency of the driven ring gear 256 coaxial with the shaft 230 of traverse motor 216, the sleeve member 254 is rotated, in the manner of a planetary cage, along with its sun pinion 255, thereby effecting planetary rotative action of the spur gear cluster 264 and, through the small diameter pinion 266 of the latter, a geared down rotation of the tubular output member 270, hence of the ball nut unit driven by the latter.

It is seen from the above that the embodiment of FIGS. 10, 11 and 12 provides, with the rapid traverse motor 216 and feed motor 215 simultaneously driven at the outset of an in-feed tool and platen stroke, a high speed forward travel from traverse motor shaft 230, augmented by planetary action transmitted from the feed motor 215 and the spur gear train appearing in FIG. 11 and shown developed in a single plane in FIG. 12. When the traverse motor 216 cuts out following the rapid traverse phase, feed continues without interruption through the spur gear set from feed motor 215 alone, dropping in speed as motor 215 is switched from its high speed to its low speed rating, and through the planetary set.

As the platen approaches bottom, it trips the timer relay 200 which, after timing out, opens the circuit of feed motor 215 and closes the circuit of traverse motor 216 in the reverse direction. However, prior to the completion of these electrical functions, the platen will bottom very briefly, whereupon the planetary gear cluster 264 will continue to rotate, rotating traverse motor shaft 230. As indicated above, the set of the springs 249 of traverse motor brake 218 is such as to permit a slight slip in this instant's time, preventing possible damage to any part. Thereupon, traverse motor 216 is reversed and the platen partakes of a rapid reverse movement to its initial position.

The preferred embodiment of FIG. 10 is substantially identical to that first described in the nature of its smoothly merged forward or in-feed rapid traverse and feed phases. It features various simplifications and compactings of the structure shown in FIGS. 1 through 7, including an elimination of the relatively expensive worm gear and worm set 69, 70, the simplification of the three cluster gears 75 of the planetary set to but a single cluster 264, the elimination of the electromagnet brake 24 of the feed motor (thus likewise simplifying of the circuitry, otherwise shown in FIG. 8, by the elimination of the components shown therein relating to the feed motor brake control circuit 209), the utilization of the highly compact, axial-wise spur gear and planetary sets appearing in FIG. 11, and like improvements designed to promote economy of construction and compactness in bulk. Yet the embodiment of FIGS. 10, 11 and 12, as coupled to a ball nut output connection to the platen in the manner of FIG. 2A, presents all of the operational and maintenance advantages described above in connection with the embodiment of FIGS. 1 through 7.

It will be appreciated by those skilled in the art that, using a planetary gear set in a train of gearing having driven connections to both of a pair of motors, a very desirable planetary differential action may be set up to introduce a shock-less transition of speed in the variable speed drive of a platen or like traverse member. Alternative methods of coupling the planetary set to the motors have been shown and described as well as one way of producing and cutting out the differential speed action. Those skilled in the art will, however, appreciate that other alternative ways of introducing and controlling such planetary differential action are available, as by varying the scheme of motor energization, by selectively braking, and the like. Therefore it is intended that the claims to follow shall be construed in the light of these considerations.

What I claim as my invention is:

1. A combined drive for a machine tool or like unit having a movable platen, comprising a motorized mechanism to move said platen in forward and reverse strokes, including a first electrical traverse motor and a second electrical feed motor, said motors having a common output member provided with means connecting the same to said platen to drive the latter, and gear means operatively connecting said motors to said output member to produce a smooth combined forward traverse and feed stroke of said output member and platen at varying speed which is free of a shock transition point between successive traverse and feed components of said stroke, including means to energize said motors simultaneously during an initial forward traverse phase of said stroke and to render the traverse motor ineffective to drive during a following forward feed phase, said gear means including a planetary gear set having a driving connection to said output member and a driven connection to said traverse motor, and a further gear set drivingly connecting said planetary set to said feed motor for the simultaneous drive of the output member by both motors in said initial phase, said further gear set comprising solely a train of spur gearing having a direct driving connection between said feed motor and said planetary set.

2. A combined drive in accordance with claim 1, in which said train of spur gearing comprises but two decks of meshing spur pinion and gear members arranged in close relation to one another in the axial direction of the pinion and gear axes.

3. A combined drive in accordance with claim 1, in which said output member is coaxially fixed to a rotatable screw of a ball nut unit, the nut of which is fixedly connected to said platen.

4. A combined drive for a machine tool or like unit having a movable platen, comprising a motorized mechanism to move said platen in forward and reverse strokes, including a first traverse motor and a second feed motor, said motors having a common output member disposed coaxially of the traverse motor and provided with means connecting the same to said platen to drive the latter, and gear means operatively connecting said motors to said output member to produce a smooth combined forward traverse and feed stroke of said output member and platen at varying speed which is free of a shock transition point between successive traverse and feed components of said stroke, including means to operate said motors simultaneously during an initial forward traverse phase of said stroke and to render the traverse motor ineffective to drive during a following forward feed phase, said gear means including a planetary gear set having a direct spur gear-driving connection to said output member and a direct, spur gear-driven connection to said traverse motor, and a further gear set drivingly connecting said planetary set to said feed motor for the simultaneous drive of the output member by both motors in said initial phase.

5. A combined drive in accordance with claim 4, in which said further gear set comprises solely a train of spur gearing having a direct drive connection between said feed motor and said planetary set.

6. A combined drive in accordance with claim 4, in which said further gear set comprises solely a train of spur gearing having a direct drive connection between said feed motor and said planetary set, said train having but two decks of spur pinion and gear members meshing with one another in closely spaced parallel planes.

7. A combined drive in accordance with claim 4, in which said output member is coaxially fixed to a rotatable screw of a ball nut unit, the nut of which is fixedly connected to said platen.

8. A combined drive in accordance with claim 4, in which said further gear set comprises solely a train of spur gearing having a direct drive connection between said feed motor and said planetary set, said train having but two decks of spur pinion and gear members meshing with one another in closely spaced parallel planes, and in which said output member is coaxially fixed to a rotatable screw of a ball nut unit, the nut of which is fixedly connected to said platen.

References Cited by the Examiner

UNITED STATES PATENTS

| | | | |
|---|---|---|---|
| 2,519,042 | 8/50 | Granberg et al. | 74—675 |
| 2,781,616 | 2/57 | Estabrook | 74—675 |
| 3,083,592 | 4/63 | Carlstedt | 74—424.8 |

DON A. WAITE, *Primary Examiner.*